United States Patent [19]

Koehler et al.

[11] Patent Number: 5,173,275
[45] Date of Patent: Dec. 22, 1992

[54] METHOD OF REMOVING OR OF ACCUMULATING HEAVY METAL IONS FROM AN AQUEOUS SOLUTION

[75] Inventors: Gernot Koehler, Worms; Roger Klimesch, Alsbach-Haehnlein, both of Fed. Rep. of Germany

[73] Assignee: BASF Aktiengesellschaft, Ludwigshafen, Fed. Rep. of Germany

[21] Appl. No.: 714,289

[22] Filed: Jun. 12, 1991

[30] Foreign Application Priority Data

Jun. 15, 1990 [DE] Fed. Rep. of Germany ....... 4019052

[51] Int. Cl.$^5$ .................... C01G 5/00; C01G 9/00; C01G 13/00; C22B 43/00
[52] U.S. Cl. .................................. 423/23; 423/99
[58] Field of Search ............... 423/23, 24, 99; 75/722, 75/723

[56] References Cited

U.S. PATENT DOCUMENTS

| | | |
|---|---|---|
| 3,970,553 | 7/1976 | Terajima et al. ............... 423/25 |
| 4,601,889 | 7/1986 | Sakamoto et al. . |
| 4,604,321 | 8/1986 | Okahara et al. . |
| 4,876,036 | 10/1989 | Candau et al. ............... 423/24 |

FOREIGN PATENT DOCUMENTS

| | | |
|---|---|---|
| 340975 | 11/1989 | European Pat. Off. . |
| 2711609 | 3/1977 | Fed. Rep. of Germany . |
| 2755170 | 12/1977 | Fed. Rep. of Germany . |
| 3808088 | 3/1988 | Fed. Rep. of Germany . |
| 1590548 | 12/1977 | United Kingdom . |
| 1602341 | 3/1978 | United Kingdom . |
| 1602342 | 3/1978 | United Kingdom . |

Primary Examiner—Theodore Morris
Assistant Examiner—P. L. Hailey
Attorney, Agent, or Firm—Keil & Weinkauf

[57] ABSTRACT

A method of removing or of accumulating heavy metal ions from an aqueous solution by contacting the latter with an ethylene copolymer, in which a copolymer of ethylene with (meth)acrylic acid and a (meth)acrylate is used, in which the carboxyl groups may be neutralized by metal ions to an extent of 100% or less.

2 Claims, No Drawings

METHOD OF REMOVING OR OF ACCUMULATING HEAVY METAL IONS FROM AN AQUEOUS SOLUTION

The present invention relates to a method of removing or of accumulating heavy metal ions from an aqueous solution by contacting the latter with an ethylene copolymer.

Methods of removing heavy metal ions from water have been disclosed. For example, DE-C 3,808,088 describes a method of separating heavy metal ions such as cadmium, tin and lead from industrial waste water comprising the addition of the hydroxide of aluminum, iron or chromium to the waste water followed by stirring for several hours and filtration.

DE-OS 2,755,170 discloses a resin which contains uranium adduct units and is useful for the removal of ions from aqueous or non-aqueous media. Such resins act as reducing agents and reduce the metal salts to metals, which are then removed by filtration.

Finally, EP-A 0,340,975 describes an ethylene copolymer for the absorption of metal ions from solutions, which copolymer is composed of ethylene and at least one specific aminoalkyl acrylate.

A drawback of this method is that a strong acid must be added to the solution prior to separation.

Similarly, methods of accumulating heavy metal ions from water are known per se. For example, DE-C 2,711,609 describes a method of obtaining dissolved uranium from sea water by contacting the latter with an adsorber matrix consisting of a biologically recent humic acid and a supporting material.

U.S. Pat. No. 4,604,321 discloses an adsorbent material for mercury which consists of a conjugated diolefine on a support.

U.S. Pat. No. 4,601,889 describes a method of recovering heavy metal ions from aqueous solutions, in which a polymer containing a specific hydrazide group is used in adsorbent.

The preparation of the monomers required for these polymers is very expensive, however.

It is one object of the present invention to provide a method of removing heavy metal ions from water, which does not necessitate the addition of auxiliaries of the aqueous solution and by means of which the heavy metal ions are selectively removed in a short period of time with the possibility of recovery thereof.

Another object of the present invention is to provide a method of accumulating heavy metal ions from water, by means of which the heavy metal ions are selectively separated in a short period of time with the possibility of their recovery and in which an adsorbent is used which is readily obtainable, simple to handle and cheap to produce.

The aforementioned objects are achieved by the method defined above, in which a copolymer of ethylene with (meth)acrylic acid and a (meth)acrylate is used, in which the carboxyl groups may be neutralized by metal ions to an extent of 100% or less.

The stages of the process and the synthesis components used are described below.

The copolymers of ethylene with (meth)acrylic acid and a (meth)acrylate which are suitable for use in the present process are known per se and are described, for example, in GB-A 2,091,745, U.S. Pat. No. 3,520,861, U.S. Pat. No. 3,264,272, GB-A 1,011,981, U.S. Pat. No. 3,404,134, U.S. Pat. No. 3,969,434 and DE 3,539,469. They may be neutralized to an extent of up to 100% by metal ions such as sodium, potassium, calcium and magnesium ions to form socalled ionomers such as are described in U.S. Pat. No. 3,264,272, EP-A 223,182, EP-A 193,110, U.S. Pat. No. 3,006,029, and EP-A 349,826.

Suitable ethylene copolymers for the present process are those which contain from 40 to 87% w/w, preferably from 40 to 75% w/w, of copolymerized ethylene units, based on the copolymer.

From 6 to 25% w/w and preferably from 8 to 20% w/w of (meth)acrylic acid is used, based on the copolymer.

Suitable acrylates or methacrylates are those with linear or branched monoalcohols having from 1 to 12 carbon atoms, e.g. methyl acrylate, ethyl acrylate, isopropyl acrylate, methyl methacrylate, n-butyl acrylate, n-butyl methacrylate, isobutyl acrylate, isobutyl methacrylate, t-butyl acrylate, 2-ethylhexyl acrylate, 2-ethylhexyl methacrylate, lauryl acrylate and mixtures thereof. Preferred esters are n-butyl acrylate, 2-ethylhexyl acrylate and lauryl acrylate.

These (meth)acrylates are used in an amount of from 2 to 30% w/w and preferably from 5 to 20% w/w, based on the copolymer.

Other (meth)acrylates which may be additionally used are those in which the alcohol radical is an alkyl polyglycol having a molecular weight of from 320 to 1,100. The alkyl polyglycols are composed of units of ethylene glycol and/or propylene glycol. Alkyl polyethylene glycols having from 2 to 25 and preferably from 8 to 15, units of ethylene glycol are preferred.

Examples of suitable compounds are methyl polyethylene glycol (400) acrylate, methyl polyethylene glycol (460) acrylate and methyl polyethylene glycol (660) acrylate.

The co-use of from 0 to 30% w/w (based on the copolymer) of alkyl polyglycol (meth)acrylate is possible. If used, an amount of from 5 to 20% w/w has proved to be satisfactory.

The ethylene copolymer has a melt flow index ranging from 50 to 500 g/10 min and preferably from 75 to 260 g/10 min as measured by DIN 53,735 (190° C.; 2.16 kp load). The polymer may be used in the form of, say, granules, e.g. to be packed into a column, or cast film or extruded sheeting.

The process may be carried out by chromatographic means or take the form of a diaphragm process or a process in which the ethylene copolymer is placed in the aqueous solution or any other prior art method.

When employing the method for the purpose of removing heavy metal ions from an aqueous solution, it is advantageous to resort to a chromatographic method, in which granules of the copolymer are filled into a chromatography column and the aqueous solution containing heavy metal ions is caused to pass continuously through the column. The concentration of metal ions in the eluate is determined at desired intervals. When the column is saturated with metal ions, it can be regenerated or replaced by another.

When the method is employed for the purpose of accumulating heavy metal ions from a large quantity of aqueous solution such as sea water, a method in which the ethylene copolymer is placed in the aqueous solution containing the heavy metal ions has given satisfactory results. To this end, the ethylene copolymer is used in the form of granules, cast film or blown sheeting and is placed in the aqueous solution containing the heavy metal ions for a specific period of time and then removed therefrom.

Regeneration of the ethylene copolymer or desorption of the heavy metal ions from the ethylene copolymer is carried out in the usual way by contacting the ethylene copolymer with an eluent. Examples of suitable eluents are aqueous solutions of metal salts such as sodium chloride, potassium chloride or calcium chloride or dilute mineral acids such as hydrochloric acid or sulfuric acid.

If the copolymer used is one having partially to completely neutralized carboxyl groups, the metal ions used for neutralization are replaced by the heavy metal ions. The replaced metal ions are eluted and are contained in the eluate. This procedure may be advantageous when the treated water is to be re-used in the process and must therefore be neutral.

The method gives satisfactory results on the following heavy metal ions: mercury, uranium, silver and zinc ions.

Its preferred use applies to the removal or accumulation of mercury and uranium ions.

The method achieves selective removal of the heavy metal ions from the aqueous solution in a short period of time and accumulation thereof on the ethylene copolymer. It is useful for the recovery of metals from sea water and for the treatment of industrial waste water.

EXAMPLE 1

A chromatography column was packed with 50.0 g of an ethylene copolymer comprising 50% w/w of ethylene, 19% w/w of acrylic acid, 21% w/w of ethylhexyl acrylate and 10% w/w of a methyl polyglycol acrylate having about 10 ethylene glycol units. An aqueous solution containing 5 mg of mercury ions per liter was passed through the column at the rate of 1 liter per hour. The mercury concentration in the solution was determined before and after the solution was passed through the column.

| Sample: | 1 | 2 | 3 | 4 | 5 | 6 | 7 | 8 |
|---|---|---|---|---|---|---|---|---|
| Time (min) | 15 | 30 | 45 | 60 | 75 | 90 | 105 | 115 |
| Quantity of soln. treated (ml) | 240 | 500 | 735 | 980 | 1250 | 1520 | 1760 | 1950 |

| Sample | Concentration | |
|---|---|---|
| | mg Hg/l | Molarity |
| 0 | 5 | $2.5 \cdot 10^{-5}$ |
| 1 | 0.3 | $1.5 \cdot 10^{-6}$ |
| 2 | 0.2 | $1.0 \cdot 10^{-6}$ |
| 3 | 0.2 | $1.0 \cdot 10^{-6}$ |
| 4 | 0.3 | $1.5 \cdot 10^{-6}$ |
| 5 | 0.3 | $1.5 \cdot 10^{-6}$ |
| 6 | 0.3 | $1.5 \cdot 10^{-6}$ |
| 7 | 0.3 | $1.5 \cdot 10^{-6}$ |
| 8 | 0.3 | $1.5 \cdot 10^{-6}$ |

EXAMPLE 2

50 g of the copolymer described in Example 1 were filled into a chromatography column. An aqueous solution containing 6 mg of uranyl ions per liter was passed through the column at the rate of 1 liter/hour. The uranyl concentration in the solution was determined before and after the solution was passed through the column.

| Sample: | 1 | 2 | 3 | 4 | 5 | 6 | 7 | 8 |
|---|---|---|---|---|---|---|---|---|
| Time (min) | 15 | 30 | 45 | 60 | 75 | 90 | 105 | 115 |
| Quantity of soln. treated (ml) | 240 | 490 | 725 | 1100 | 1250 | 1600 | 1820 | 2050 |

| Sample | Concentration | |
|---|---|---|
| | mg UO$_2$/l | Molarity |
| 0 | 6.0 | $2.2 \cdot 10^{-5}$ |
| 1 | 0.1 | $3.7 \cdot 10^{-7}$ |
| 2 | 0.2 | $7.4 \cdot 10^{-7}$ |
| 3 | 0.2 | $7.4 \cdot 10^{-7}$ |
| 4 | 0.1 | $3.7 \cdot 10^{-7}$ |
| 5 | 0.1 | $3.7 \cdot 10^{-7}$ |
| 6 | 0.2 | $7.4 \cdot 10^{-7}$ |
| 7 | 0.2 | $7.4 \cdot 10^{-7}$ |
| 8 | 0.2 | $7.4 \cdot 10^{-7}$ |

EXAMPLES 3 to 6

7.5 g of the ethylene copolymer described in Example 1 were dissolved in 75 ml of tetrahydrofuran. The solution was poured on to a flat surface (10×10 cm) and the solvent allowed to evaporate at room temperature. The resulting film was used for further tests.

In Example 3, the film thus obtained was placed in a shallow tray containing 300 ml of a solution containing 20.0 mg of uranyl acetate. The uranium content of the solution was measured before treatment and after test periods of 48 and 192 hours respectively. The uranium content of the polymer was determined after a test period of 192 hours.

In Examples 4 to 6, zinc chloride, silver nitrate and mercury nitrate were used. The results are given in the Table below.

TABLE

Accumulation of metal ions on ethylene copolymer

| Ex. | Metal salt | Concentration of metal in aqueous solution [mg/300 ml] | | | Metal ions collected by copolymer [mg/kg] | Removal of metal ions from soln. [%] |
|---|---|---|---|---|---|---|
| | | at start | after 48 h | after 192 h | | |
| 3 | uranyl acetate | 20.0 | 8.00 | 3.33 | 700.0 | 87.5 |
| 4 | ZnCl$_2$ | 0.44 | 0.35 | 0.33 | 2.0 | 11.4 |
| 5 | AgNO$_3$ | 1.10 | 0.90 | 0.56 | 7.0 | 15.9 |
| 6 | Hg(NO$_3$)$_2$ | 0.80 | 0.07 | 0.06 | 18.0 | 56.3 |

We claim:

1. A method of removing the heavy metal ions mercury, uranium, silver and/or zinc from an aqueous solution containing such ions which comprises:
   passing the solution containing the heavy metal ions through a chromatography column packed with granules consisting essentially of an ethylene copolymer composed of
   from 40 to 87% w/w of ethylene,
   from 6 to 25% w/w of (meth) acrylic acid,
   from 2 to 30% w/w of (meth) acrylate and
   from 5 to 25% w/w of alkyl polyglycol (meth) acrylate, the percentages totalling 100,
the carboxyl groups in said copolymer being either non-neutralized or being neutralized to an extent of 100% or less of said carboxyl groups.

2. A method as defined in claim 1, wherein the carboxyl groups in the copolymer are neutralized in an extent of 100% or less by sodium, potassium, magnesium or calcium ions.

* * * * *

UNITED STATES PATENT AND TRADEMARK OFFICE
CERTIFICATE OF CORRECTION

PATENT NO. : 5,173,275

DATED : December 22, 1992

INVENTOR(S) : KOEHLER et al.

It is certified that error appears in the above-identified patent and that said Letters Patent is hereby corrected as shown below:

On the Title page, item [30] under Foreign Application Priority Data insert:

-- Jun. 15, 1990 [DE] Fed. Rep. of Germany ......, 4019050 --

Signed and Sealed this

Ninth Day of November, 1993

Attest:

BRUCE LEHMAN

Attesting Officer     Commissioner of Patents and Trademarks